United States Patent
Kim

(10) Patent No.: US 10,656,043 B2
(45) Date of Patent: May 19, 2020

(54) BATTERY PACK FOR ELECTRIC VEHICLES AND METHOD OF DETECTING COOLING WATER LEAKAGE IN BATTERY PACK FOR ELECTRIC VEHICLES

(71) Applicants: Hyundai Motor Company, Seoul (KR); Kia Motors Corporation, Seoul (KR)

(72) Inventor: Woo Sung Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 98 days.

(21) Appl. No.: 15/836,130

(22) Filed: Dec. 8, 2017

(65) Prior Publication Data

US 2018/0238764 A1    Aug. 23, 2018

(30) Foreign Application Priority Data

Feb. 17, 2017    (KR) .................. 10-2017-0021510

(51) Int. Cl.
| | |
|---|---|
| H01M 2/10 | (2006.01) |
| G01M 3/16 | (2006.01) |
| G01M 3/04 | (2006.01) |
| H01M 10/625 | (2014.01) |
| H01M 10/42 | (2006.01) |
| H01M 10/613 | (2014.01) |
| G01M 3/02 | (2006.01) |
| H01M 10/48 | (2006.01) |

(52) U.S. Cl.
CPC .............. *G01M 3/16* (2013.01); *G01M 3/025* (2013.01); *G01M 3/045* (2013.01); *H01M 2/1077* (2013.01); *H01M 10/42* (2013.01); *H01M 10/48* (2013.01); *H01M 10/613* (2015.04); *H01M 10/625* (2015.04); *H01M 2200/20* (2013.01); *H01M 2220/20* (2013.01)

(58) Field of Classification Search
None
See application file for complete search history.

(56) References Cited

FOREIGN PATENT DOCUMENTS

| | | |
|---|---|---|
| JP | 2011173447 A | 9/2011 |
| JP | 2013086641 A | 5/2013 |
| JP | 2014190722 A | 10/2014 |
| JP | 2014216248 A | 11/2014 |
| KR | 101317523 B1 | 10/2013 |

OTHER PUBLICATIONS

Lee (KR 20120069238 A, machine translation) (Year: 2012).*
Kamata (JP 2013086641 A, machine translation). (Year: 2013).*

* cited by examiner

*Primary Examiner* — Wojciech Haske
(74) *Attorney, Agent, or Firm* — Mintz Levin Cohn Ferris Glovsky and Popeo, P.C.; Peter F. Corless

(57) ABSTRACT

A battery pack for electric vehicles and a method of detecting cooling water leakage in the battery pack for electric vehicles are provided. The battery pack includes a moisture collection unit that is disposed in the battery pack and a moisture discharge unit that is disposed in a bottom of the moisture collection unit. A moisture discharge detection unit detects whether moisture is being discharged through the moisture discharge unit and a controller detects and adjusts the amount of moisture discharged through the moisture discharge unit.

13 Claims, 3 Drawing Sheets

BATTERY PACK FOR ELECTRIC VEHICLES AND METHOD OF DETECTING COOLING WATER LEAKAGE IN BATTERY PACK FOR ELECTRIC VEHICLES

CROSS-REFERENCE TO RELATED APPLICATION(S)

This application claims the benefit of Korean Patent Application No. 10-2017-0021510, filed on Feb. 17, 2017, which is hereby incorporated by reference as if fully set forth herein.

BACKGROUND

Field of the Invention

The present invention relates to a battery pack for electric vehicles and a method of detecting cooling water leakage in the battery pack for electric vehicles.

Discussion of the Related Art

As regulations on emissions from vehicles using fossil fuel such as, for example, gasoline or diesel fuel, have become more stringent, electric vehicles, which are lightweight and have improved output performance, have been developed to reduce atmospheric contamination. Electric vehicles are classified into pure electric vehicles (EVs) driven by a driving a driving motor, hybrid electric vehicles (HEVs) driven by an engine and a driving motor, fuel cell electric vehicles (FCEVs) driven by driving a driving motor using electric power generated by a fuel cell, etc.

The electric vehicle includes a driving motor that operates the vehicle and a battery as an energy storage device that supplies electric power to the driving motor. For example, nickel-hydrogen batteries and lithium-polymer batteries are well known in the art. This type of battery may be configured as a battery pack, in which a plurality of battery modules are combined in series or in parallel.

When the battery generates electric power for operating the electric vehicle, the battery also generates heat. The generated heat accelerates discharge of the battery, decreases a charging rate, and consequently deteriorates the performance of the battery. Therefore, the battery must be cooled. To cool down the heat generated by the battery, an air-cooling method has been developed for cooling the battery using air flow and a water-cooling method has been developed for cooling the battery using cooling water.

The water-cooling method has higher cooling efficiency than the air-cooling method. However, when cooling water leaks due to deterioration of sealing performance or the like, the safety of the battery pack may be at risk. Since water is an electrically conductive material, when the water touches a part to which a high voltage is applied, a short circuit and a fire due to the short circuit may occur. A lithium battery fire is more difficult to extinguish than a common fire. In severe cases, the battery may explode.

Further, when a pouch-type lithium battery is continuously exposed to water, bonding portions of the pouch may melt down, and electrodes and an electrolyte in the battery may be exposed. This may cause electrolyte leakage and a short circuit in the battery, and, in severe cases, may cause a fire.

SUMMARY

Accordingly, the present invention provides a battery pack for electric vehicles and a method of detecting cooling water leakage in the battery pack for electric vehicles. An object of the present invention is to provide a battery pack for electric vehicles, which has a structure capable of detecting cooling water leakage in the battery pack and discharging the cooling water, and a method of detecting cooling water leakage in the battery pack for electric vehicles.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a battery pack for electric vehicles may include a moisture collection unit disposed in the battery pack, a moisture discharge unit disposed in a bottom of the moisture collection unit, a moisture discharge detection unit configured to detect whether moisture is being discharged through the moisture discharge unit, and a controller configured to check and adjust the amount of moisture discharged through the moisture discharge unit, wherein the moisture discharge unit may include a one-way plug.

When moisture collected in the moisture collection unit exceeds a predetermined level, the moisture may be discharged through the moisture discharge unit. The one-way plug may be coated with an electrically conductive material to sense an electrical signal. The moisture collection unit may include a first moisture collection unit and a second moisture collection unit.

The first moisture collection unit may include a first plate disposed at a lower portion inside the moisture collection unit, the first plate having a horizontally oriented surface, a first opening/closing portion mounted in a center of the first plate, and a first absorbent material disposed on the first opening/closing portion. The second moisture collection unit may include a second plate disposed above the first plate, a second opening/closing portion mounted in a center of the second plate, and a second absorbent material disposed on the second opening/closing portion. The moisture collection unit may include a moisture absorbent sheet disposed on an inner surface and an outer surface thereof. The battery pack may have a lower surface slanted downward from an edge of the lower surface to a center of the lower surface.

In another aspect of the present invention, a method of detecting cooling water leakage in the above-mentioned battery pack for electric vehicles may include monitoring a closed state of the one-way plug, detecting a number of openings of the one-way plug, upon determining that the one-way plug is open, detecting cooling water leakage in the battery pack for electric vehicles, and transmitting information regarding the cooling water leakage to the controller.

In the detecting of the number of openings of the one-way plug, when the number is 0, the closed state of the one-way plug may be monitored. In addition, when the number is 1, the method may further include measuring a time period during which the one-way plug is maintained in an open state. In the measuring of the time period during which the one-way plug is maintained in an open state, when the time period is less than a predetermined time period, the closed state of the one-way plug may be monitored.

In addition, when the time period is equal to or greater than a predetermined time period, cooling water leakage may be detected in the battery pack for electric vehicles. In the detecting of the number of openings of the one-way plug, when the number is 2 or more, cooling water leakage may be detected in the battery pack for electric vehicles.

It is to be understood that both the foregoing general description and the following detailed description of the present invention are exemplary and explanatory and are intended to provide further explanation of the present invention as claimed.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings.

DETAILED DESCRIPTION

Figure 1:
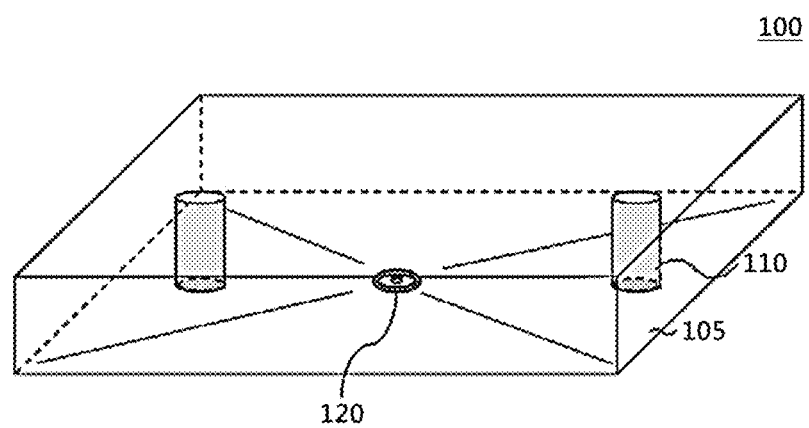
FIG. 1 is a view illustrating a battery pack for electric vehicles according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to the exemplary embodiments of the present invention, examples of which are illustrated in the accompanying drawings. Wherever possible, the same reference numbers will be used throughout the drawings to refer to the same or like parts. In the following description of the exemplary embodiments, it will be understood that, when an element is referred to as being "on" or "under" another element, it can be directly on or under another element, or can be indirectly disposed such that an intervening element is also present. In addition, the terms "on" or "under" as used herein may encompass not only an upward direction with respect to the associated element, but also a downward direction with respect to the associated element.

Figure 2:
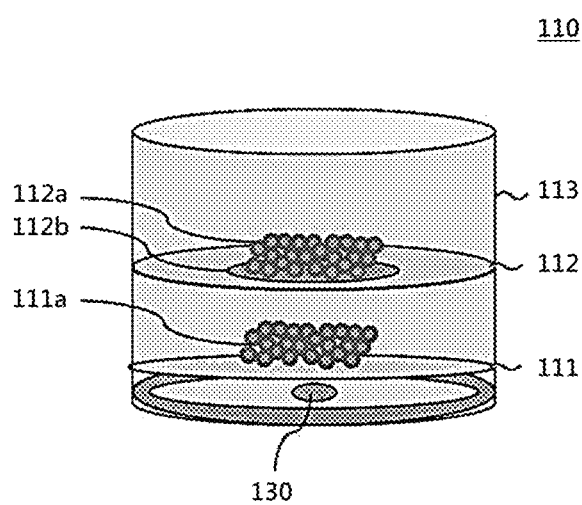
FIG. 2 is a view illustrating a moisture collection unit and a moisture discharge unit of the battery pack for electric vehicles according to the exemplary embodiment of the present invention.

FIG. 1 is a view illustrating a battery pack for electric vehicles according to an exemplary embodiment of the present invention, and FIG. 2 is a view illustrating a moisture collection unit and a moisture discharge unit of the battery pack for electric vehicles according to the exemplary embodiment of the present invention. Referring to FIGS. 1 and 2, a battery pack 100 for electric vehicles according to the exemplary embodiment may include a moisture collection unit 110, a moisture discharge unit 130, a moisture discharge detection unit (not shown), and a controller (not shown). The various units may be operated by the controller and the moisture discharge detection unit may be a sensor.

In particular, the moisture collection unit 110 may be disposed in the battery pack 100 and may be configured to collect moisture contained in the battery pack. In addition, a plurality of moisture collection units 110, each having a cylindrical shape, may be arranged in the battery pack 100. Although not illustrated in the drawings, a plurality of battery modules may be arranged in the battery pack 100, and the moisture collection units 110 may be disposed in the area in which the battery modules are not located. A plurality of moisture collection units 110 may be evenly distributed in such an available area in the battery pack 100 to collect moisture contained in the battery pack 100.

Each of the moisture collection units 110 may include a first moisture collection unit 111 and a second moisture collection unit 112. The first moisture collection unit may include a first plate 111, a first opening/closing portion (not shown), and a first absorbent material 111a. The first plate 111 may be disposed at a lower portion inside the moisture collection unit 110 and may be arranged such that the surface thereof is oriented horizontally. The first opening/closing portion may be mounted in the center of the first plate. When the first opening/closing portion is closed, the first absorbent material may be disposed on the first opening/closing portion. The first absorbent material 111a may include any one selected from the group consisting of: calcium chloride, silica gel, and activated alumina. However, the exemplary embodiment is not limited thereto.

The second moisture collection unit may include a second plate 112, a second opening/closing portion 112b, and a second absorbent material 112a. The second plate 112 may be disposed above the first plate 111 to be spaced a predetermined distance apart from and parallel to the first plate 111. The second opening/closing portion 112b may be mounted in the center of the second plate 112. When the second opening/closing portion 112b is closed, the second absorbent material 112a may be disposed on the second opening/closing portion 112b. Similar to the first absorbent material 111a, the second absorbent material 112a may include any one selected from the group consisting of: calcium chloride, silica gel, and activated alumina. However, the exemplary embodiment is not limited thereto.

Additionally, a moisture absorbent sheet 113 may be disposed on the inner surface and the outer surface of the moisture collection unit 110. The moisture absorbent sheet 113 disposed on the inner surface or the outer surface of the moisture collection unit 110 may prevent the moisture collected in the first moisture collection unit and the second moisture collection unit from evaporating and being introduced again into the battery pack. Further, the moisture absorbent sheet 113 may also capture fine moisture particles in the battery pack 100.

In the exemplary embodiment, the first absorbent material 111a of the first moisture collection unit may be configured to collect moisture present in the lower portion of the moisture collection unit, and the moisture absorbent sheet 113 may be configured to absorb moisture evaporated from the collected moisture. The second absorbent material 112a may be maintained in a sealed state to prevent exposure until the first absorbent material 111a is depleted. When the moisture collected by the first absorbent material 111a is condensed, the condensed moisture may be discharged to the outside of the battery pack.

To expose the second absorbent material 112b, which has been maintained in a sealed state, after the moisture condensed in the first absorbent material 111a is discharged, the second opening/closing portion 112b may be disposed in the second plate 112. The second opening/closing portion 112b may include a switch configured to operate the second opening/closing portion 112b to open after the moisture collected in the first absorbent material 111a is discharged. When the moisture collected in the first absorbent material 111a is discharged, a one-way plug may be open, which will be described herein below. After the moisture collected in the first absorbent material 111a is discharged, a signal related to closing of the one-way plug may be transmitted to the controller, which will be described herein below.

The switch may be configured to open the second opening/closing portion 112b when the signal related to closing of the one-way plug is terminated. The moisture discharge unit 130 may be disposed in the bottom of the moisture collection unit 110. In addition, the moisture discharge unit 130 may be disposed in an aperture formed in the lower surface of the battery pack 100 and may be configured to discharge the moisture collected in the moisture collection unit 110 to the outside of the battery pack 100. When the moisture collected in the moisture collection unit exceeds a predetermined level, the moisture may be discharged through the moisture discharge unit. The one-way plug may be disposed in the moisture discharge unit 130 and may operate as an opening/closing device configured to discharge cooling water from the battery pack 100 to the outside. Particularly, the predetermined level may be defined as the minimum amount of moisture that can be changed from the closed state to the open state by pressing the one-way plug.

Figure 3:
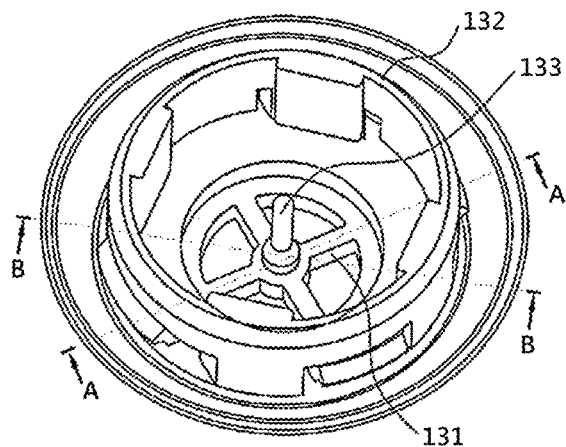
FIG. 3 is a view illustrating a one-way plug mounted in the battery pack for electric vehicles according to the exemplary embodiment of the present invention.
Figure 4:
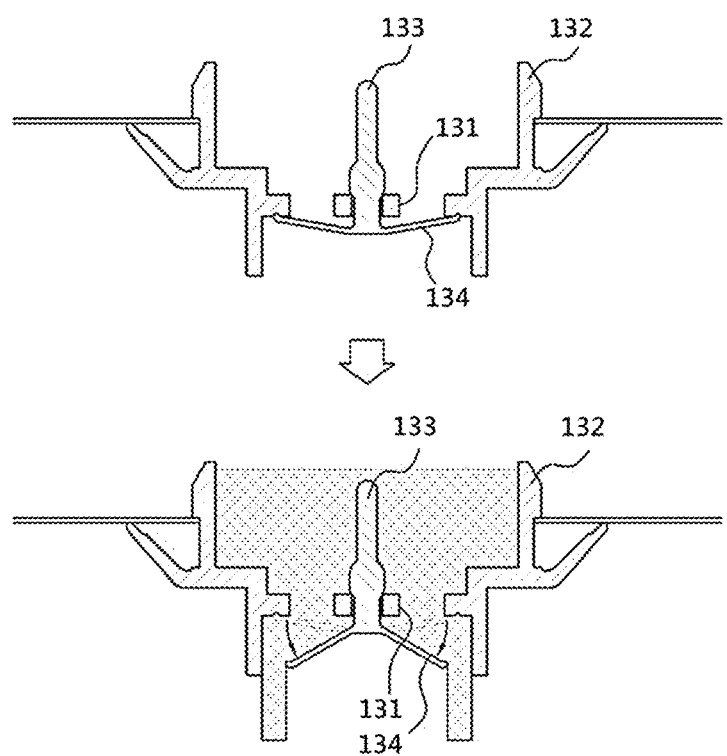
FIG. 4 is a view illustrating the opening/closing operation of the one-way plug shown in FIG. 3 according to the exemplary embodiment of the present invention.

FIG. 3 is a view illustrating the one-way plug mounted in the battery pack for electric vehicles according to the exemplary embodiment of the present invention, and FIG. 4 is a view illustrating the opening/closing operation of the one-way plug shown in FIG. 3. Referring to FIGS. 3 and 4, the one-way plug 130 may include a plug body 132, which is mounted in the lower surface of the battery pack 100 and has a plurality of discharge apertures 131 formed therein, and an elastic body 133, which is mounted in the lower surface of the plug body 132 and has a wing portion 134 for opening and closing the discharge apertures 131.

The elastic body 133 may be made of a plastic material. When there is no moisture on the lower surface of the battery pack 100, the wing portion 134 may be maintained in the state in which the discharge apertures 131 are closed. When moisture gathers on the lower surface of the battery pack 100, the wing portion 134 may be pushed down due to the weight of the moisture to open the discharge apertures 131, through which the moisture may be discharged to the outside. The moisture discharge detection unit (not shown) may be configured to detect whether moisture is being discharged through the moisture discharge unit. The moisture discharge detection unit may specifically be configured to detect cooling water leakage by counting the number of times the one-way plug is opened (e.g., the number of openings of the one-way plug).

For example, depending on the amount of moisture that is present in the battery pack, the one-way plug may be opened initially. Subsequently, since the amount of residual moisture in the battery pack is insignificant, there is no possibility of an increase in the amount of moisture in the battery pack except during cooling water leakage. Accordingly, when the one-way plug is opened twice or more, a cooling water leakage may be detected.

Particularly, the controller (not shown) may be configured to detect the amount of moisture discharged through the moisture discharge unit. The one-way plug 130 may be coated with an electrically conductive material to sense an electrical signal. The upper end of the one-way plug 130 may be coated with an electrically conductive material, and a battery management system (BMS) may be electrically connected to the region coated with the electrically conductive material.

The one-way plug may carry electricity to other components when it is in a closed state, but the one-way plug may not carry electricity to other components when it is in an open state. Accordingly, it may be possible to determine whether the one-way plug is in an open state by measuring the time period during which an electrical signal is not generated. The controller may be configured to receive information regarding whether the one-way plug is in an open state and the may be configured to count the number of times the one-way plug is opened.

The lower surface of the battery pack 100 may be a slanted surface 105, which is slanted downward from the edge thereof to the center thereof to allow the cooling water present in the battery pack 100 as well as the moisture that has not been absorbed in the first moisture collection unit and the second moisture collection unit to flow to a predetermined region in the lower surface 105 of the battery pack 100. In addition, a discharge aperture 120 may be formed in the lower surface of the battery pack 100.

In the exemplary embodiment, the lower surface of the battery pack 100 may be formed as the slanted surface 105 that is slanted downward from the edge thereof to the center thereof to discharge cooling water through the center of the slanted surface 105 of the battery pack 100. However, the shape of the slanted surface may be varied in accordance with the position of the discharge aperture 120 through which the cooling water may be discharged.

Figure 5:
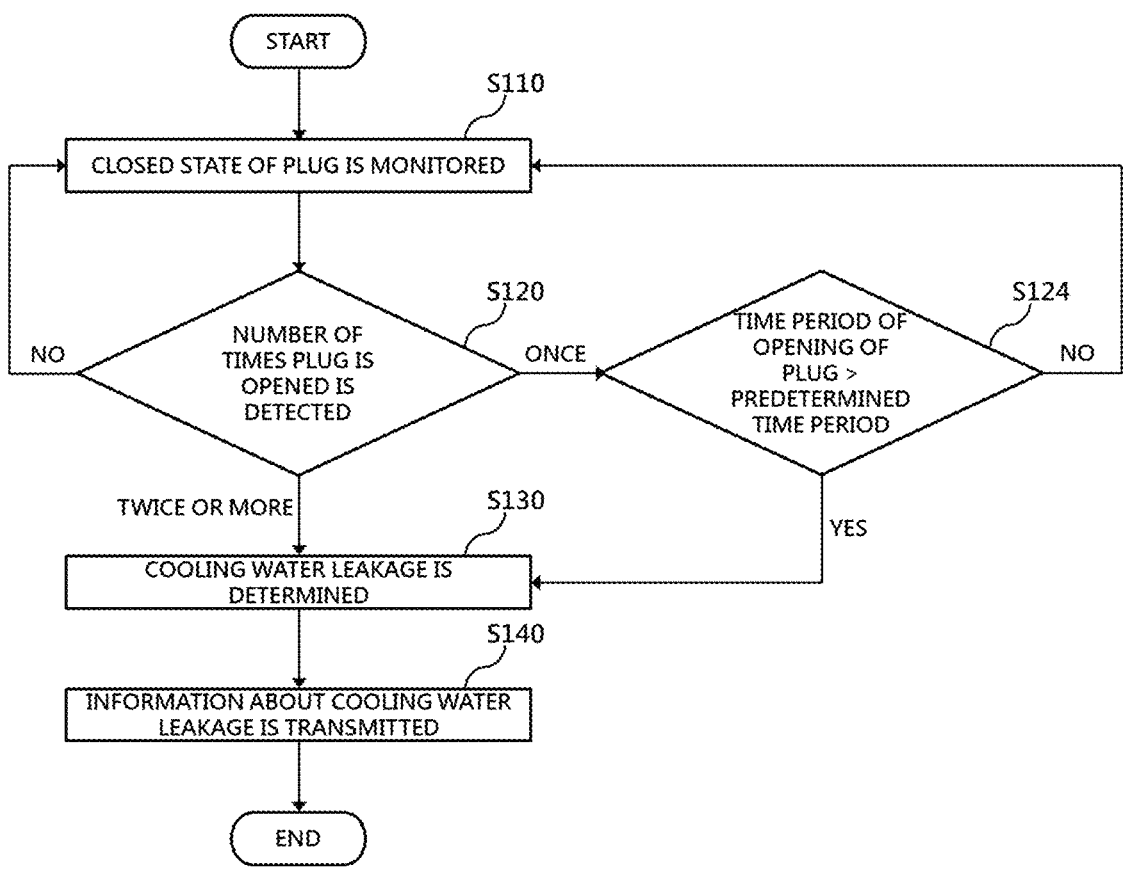
FIG. 5 is a flowchart illustrating a method of detecting cooling water leakage in the battery pack for electric vehicles according to an exemplary embodiment of the present invention.

FIG. 5 is a flowchart illustrating a method of detecting cooling water leakage in the battery pack for electric vehicles according to an exemplary embodiment of the present invention. Referring to FIG. 5, a method (S100) of detecting cooling water leakage in the battery pack for electric vehicles according to the exemplary embodiment may include monitoring the closed state of the one-way plug of the battery pack for electric vehicles (S110), detecting the number of times the one-way plug is opened (S120), detecting cooling water leakage in the battery pack for electric vehicles in response to determining that the one-way plug is open (S130), and transmitting information regarding the cooling water leakage to the controller (S140).

In particular, the closed state of the one-way plug of the battery pack for electric vehicles may be monitored at step S110. In step S120 of detecting the number of times the one-way plug is opened, when the number of times is 0, the process may proceed to step S110, in which the closed state of the one-way plug may be monitored. After the closed state of the one-way plug of the battery pack for electric vehicles is monitored at step S110, the number of times the one-way plug is opened may be detected at step S120.

In step S120 of detecting the number of times the one-way plug is opened, when the number of times is 1, moisture condensed in the moisture collection unit may be determined to have been discharged, and thus cooling water leakage may be detected. In response to detecting the cooling water leakage at step S130, information regarding the cooling water leakage may be transmitted to the controller at step S140.

In step S120 of detecting the number of times the one-way plug is opened, when the number of times is 1, the method may further include measuring a time period during which the one-way plug is maintained in an open state (S124). In step S124 of measuring a time period during which the one-way plug is maintained in an open state, when the time period is less than a predetermined time period, the closed state of the one-way plug may be monitored. Particularly, the predetermined time period may be defined as a discharge time of moisture determined by considering the predetermined level of the collected moisture and a size of the discharge aperture.

Further, in step S124 of measuring a time period during which the one-way plug is maintained in an open state, when the time period is equal to or greater than the predetermined time period, cooling water leakage may be detected in the battery pack for electric vehicles at step S130. In step S120 of detecting the number of times the one-way plug is opened, when the number of times is 2 or more, cooling water leakage may be detected in the battery pack for electric vehicles.

As is apparent from the above description, a battery pack for electric vehicles and a method of detecting cooling water leakage in the battery pack for electric vehicles according to the exemplary embodiment have effects of detecting cooling water leakage in the battery pack, discharging the cooling water out of the battery pack, and preventing moisture condensation in the battery pack, thereby enhancing the safety of the battery pack.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A battery pack for electric vehicles, comprising:
   a moisture collection unit disposed in the battery pack;
   a moisture discharge unit disposed in a bottom of the moisture collection unit;
   a moisture discharge detection unit configured to detect whether moisture is being discharged through the moisture discharge unit; and
   a controller configured to detect and adjust an amount of moisture discharged through the moisture discharge unit,
   wherein the moisture discharge unit includes a one-way plug, and
   wherein the one-way plug is coated with an electrically conductive material to sense an electrical signal.

2. The battery pack according to claim 1, wherein when moisture collected in the moisture collection unit exceeds a predetermined level, the moisture is discharged through the moisture discharge unit.

3. The battery pack according to claim 1, wherein the moisture collection unit includes a first moisture collection unit and a second moisture collection unit.

4. The battery pack according to claim 3, wherein the first moisture collection unit includes:
   a first plate disposed at a lower portion inside the moisture collection unit, the first plate having a surface oriented horizontally;
   a first opening/closing portion mounted in a center of the first plate; and
   a first absorbent material disposed on the first opening/closing portion.

5. The battery pack according to claim 4, wherein the second moisture collection unit includes:
   a second plate disposed above the first plate;
   a second opening/closing portion mounted in a center of the second plate; and
   a second absorbent material disposed on the second opening/closing portion.

6. The battery pack according to claim 1, wherein the moisture collection unit includes a moisture absorbent sheet disposed on an inner surface and an outer surface thereof.

7. The battery pack according to claim 1, wherein the battery pack has a lower surface that is slanted downward from an edge of the lower surface to a center of the lower surface.

8. A method of detecting cooling water leakage in the battery pack for electric vehicles according claim 1, the method comprising:
   monitoring, by a controller, a closed state of the one-way plug;
   detecting, by the controller, a number of times the one-way plug is opened; and
   in response to determining that the one-way plug is open, detecting, by the controller, cooling water leakage in the battery pack for electric vehicles.

9. The method according to claim 8, wherein in the detecting of the number of times the one-way plug is opened, when the number of times is 0, the closed state of the one-way plug is monitored.

10. The method according to claim 8, wherein in the detecting of the number of times the one-way plug is opened, when the number of times is 1, a time period during which the one-way plug is maintained in an open state is measured.

11. The method according to claim 10, wherein in the measuring of the time period during which the one-way plug is maintained in an open state, when the time period is less than a predetermined time period, the closed state of the one-way plug is monitored.

12. The method according to claim 10, wherein in the measuring of the time period during which the one-way plug is maintained in an open state, when the time period is equal to or greater than a predetermined time period, the cooling water leakage is detected in the battery pack for electric vehicles.

13. The method according to claim 10, wherein in the detecting of the number of times the one-way plug is opened, when the number of times is 2 or more, the cooling water leakage is detected in the battery pack for electric vehicles.

* * * * *